(12) United States Patent
Halpin et al.

(10) Patent No.: US 7,692,525 B1
(45) Date of Patent: Apr. 6, 2010

(54) POWER ELECTRONIC MODULE WITH AN IMPROVED CHOKE AND METHODS OF MAKING SAME

(75) Inventors: Peter John Halpin, Mequon, WI (US); Robert Allen Savatski, Port Washington, WI (US); Paul Thomas Krause, Fredonia, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/241,851

(22) Filed: Sep. 30, 2008

(51) Int. Cl.
*H01F 27/02* (2006.01)
(52) U.S. Cl. .......................... 336/96; 336/90; 336/205; 336/206; 336/207; 336/208; 363/34; 363/37; 363/141; 361/688
(58) Field of Classification Search .................. 336/90, 336/96, 205–208; 29/602.1; 363/34, 37, 363/141; 361/688
See application file for complete search history.

(56) References Cited

U.S. PATENT DOCUMENTS

| | | | | |
|---|---|---|---|---|
| 2,776,413 A | * | 1/1957 | Knouse | 336/192 |
| 2,998,583 A | * | 8/1961 | Worcester | 336/61 |
| 6,636,107 B2 | * | 10/2003 | Pelly | 327/552 |
| 2003/0210120 A1 | * | 11/2003 | Sigl | 336/198 |
| 2004/0189430 A1 | * | 9/2004 | Matsutani et al. | 336/83 |
| 2005/0012581 A1 | * | 1/2005 | Ono et al. | 336/90 |
| 2005/0068147 A1 | * | 3/2005 | Skibinski | 336/200 |
| 2006/0044103 A1 | * | 3/2006 | Roebke et al. | 336/208 |
| 2007/0052510 A1 | * | 3/2007 | Saegusa et al. | 336/92 |

* cited by examiner

*Primary Examiner*—Elvin G Enad
*Assistant Examiner*—Tszfung Chan
(74) *Attorney, Agent, or Firm*—Fletcher Yoder LLP; Alexander R. Kuszewski (57) ABSTRACT

An improved choke assembly for a power electronics device is provided. More specifically, a choke assembly with improved protection from environmental conditions such as dirt and water is provided. An improved choke assembly may include a double layer of protection around an inductor coil of a choke that seals the inductor coil from the outside environment. Another embodiment may include a choke with a projection that seals the cabinet from the cooling channel while allowing the choke leads to pass into the cabinet.

16 Claims, 6 Drawing Sheets

POWER ELECTRONIC MODULE WITH AN IMPROVED CHOKE AND METHODS OF MAKING SAME

BACKGROUND

The invention relates generally to the field of power electronic devices such as those used in power conversion and for applying power to motors and similar loads. More particularly, the invention relates to a motor drive with an improved choke that provides improved protection from the environment.

In the field of power electronic devices, a wide range of circuitry is known and currently available for converting, producing and applying power to loads. Depending upon the application, such circuitry may convert incoming power from one form to another as needed by the load. In a typical arrangement, for example, constant (or varying) frequency alternating current power (such as from a utility grid or generator) is converted to controlled frequency alternating current power to drive motors, and other loads. In this type of application, the frequency of the output power can be regulated to control the speed of the motor or other device. Many other applications exist, however, for power electronic circuits that convert alternating current power to direct current power, or vice versa, or that otherwise manipulate, filter, or modify electric signals for powering a load. Circuits of this type generally include rectifiers (converters), inverters, and power conditioning circuits. For example, a motor drive will typically include a rectifier that converts AC power to DC. Inverter circuitry then converts the DC signal into an AC signal of a particular frequency desired for driving a motor at a particular speed. Often, power conditioning circuits, such as a choke and/or a capacitor bus are used to remove unwanted voltage ripple on the internal DC bus. Depending on the power load, the power conditioning circuits, such as the choke, may conduct high levels of current and generate significant levels of heat.

The housing that holds most of the circuitry described above may be referred to as a cabinet. To dissipate the heat generated by the circuitry inside the cabinet, a motor drive unit will typically include a cooling channel adjacent to the cabinet that conducts cooling air through a heatsink thermally coupled to the circuits. To make efficient use of the space within the motor drive unit and keep heat generated by the choke out of the cabinet and away from other circuit components, the choke is usually deployed within the cooling channel rather than the cabinet. Furthermore, the motor drive may be deployed such that the cooling channel is exposed to the outdoors. Thus the choke may be subject to harsh environmental conditions due to weather, dust, and cleaning.

Therefore, it may be advantageous to provide a motor drive unit with an improved choke that enables increased protection from the environment. In particular, it may be advantageous to provide a choke that enables improved protection from water, dust, and salt.

BRIEF DESCRIPTION

The present invention relates generally to a choke configuration that addresses such needs. One embodiment of the present invention employs a double layer of protection around an inductor coil of a choke that seals the inductor coil from the outside environment. Another embodiment includes a choke with a projection that seals the cabinet from the cooling channel while allowing the choke leads to pass into the cabinet. Although the present invention is described, for convenience, in relation to a motor drive application, it will be appreciated that chokes fabricated in accordance with present techniques may be used in any choke related application, such as electrical power transmission and telecommunications, for example.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
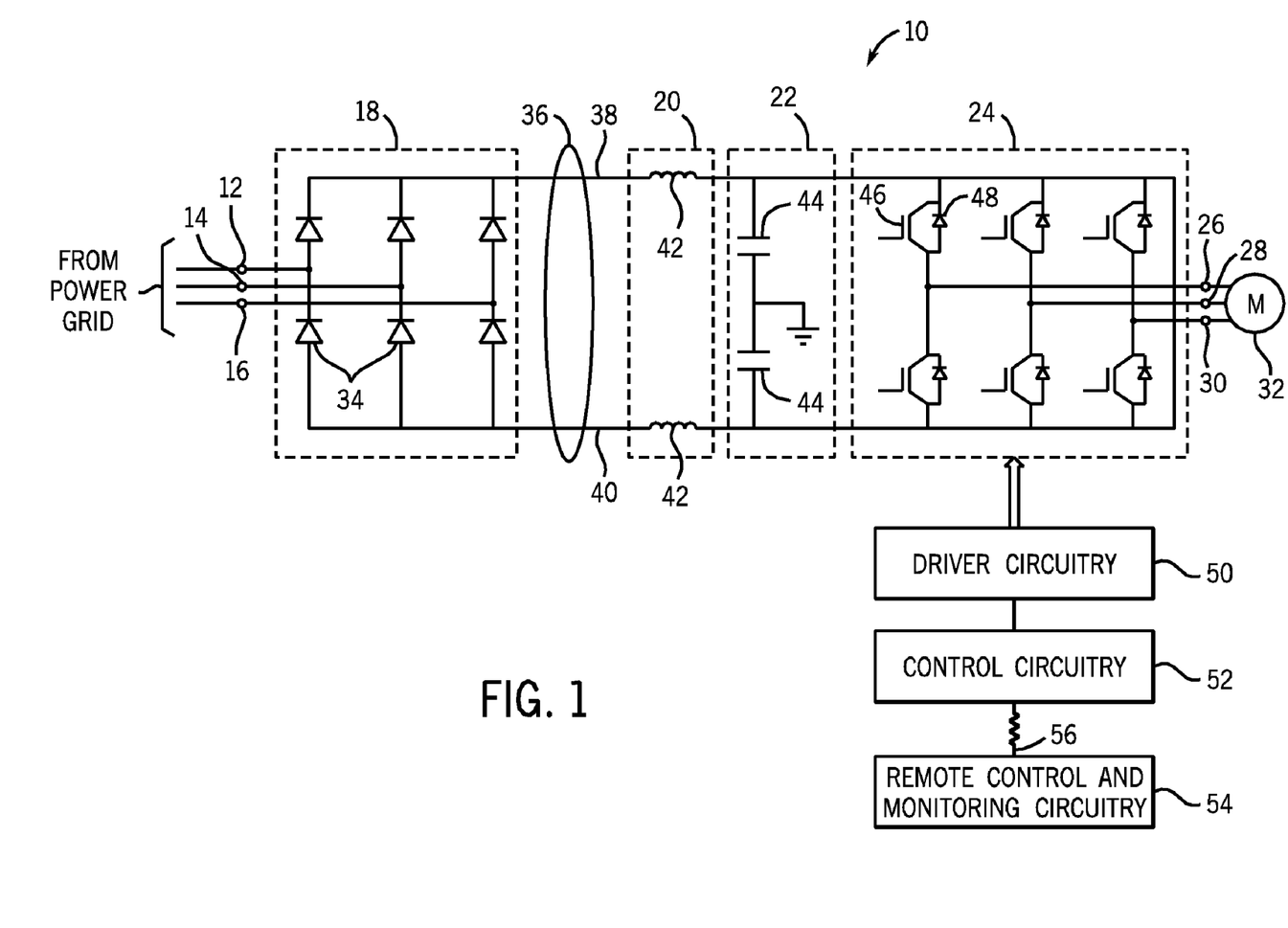
FIG. 1 is a diagrammatical representation of an exemplary motor drive circuit employing an improved choke in accordance with one embodiment of the present invention.

FIG. 1 is a diagrammatical representation of an exemplary motor drive circuit 10 employing an improved choke configuration in accordance with present embodiments. The motor drive circuit 10 includes a three phase power source electrically coupled to a set of input terminals 12, 14 and 16 that provides three phase AC power of constant frequency to a rectifier circuitry 18. In the rectifier circuitry 18, a set of six silicon-controlled rectifiers (SCRs) 34 provide full wave rectification of the three phase voltage waveform. Each input terminal entering the rectifier circuitry 18 is coupled between two SCRs 34 arranged in series, anode to cathode, which span from the high side 38 of the DC bus 36 to the low side 40 of the DC bus 36. Also coupled to the DC bus 36 is a choke 20 that has improved protection from the environment as will be explained further below. The choke 20 may include inductors 42 that are coupled to either the high side 38 or the low side 40 of the DC bus 36 and serve to smooth the rectified DC voltage waveform. Capacitors 44 link the high side 38 of the DC bus 36 with the low side 40 of the DC bus 36 and are also configured to smooth the rectified DC voltage waveform. Together, the inductors 42 and capacitors 44 serve to remove most of the AC ripple presented by the rectifier circuitry 18 so that the DC bus 36 carries a waveform closely approximating a true DC voltage. It should be noted that the three-phase implementation described herein is not intended to be limiting, and the invention may be employed on single-phase circuitry, as well as on circuitry designed for applications other than motor drives. Furthermore, the choke 20 may also be used in applications that include more than two inductors 42. For example, in some embodiments, the choke 20 may be coupled to a three phase power source and include three inductors, one for each phase.

An inverter 24 is coupled to the DC bus 36 and generates a three phase output waveform at a desired frequency for driving a motor 32 connected to the output terminals 26, 28 and 30. Within the inverter 24, two switches 46 are coupled in series, collector to emitter, between the high side 38 and low side 40 of the DC bus 36. Three of these switch pairs are then coupled in parallel to the DC bus 36, for a total of six switches 46. Each switch 46 is paired with a flyback diode 48 such that the collector is coupled to the anode and the emitter is coupled to the cathode. Each of the output terminals 26, 28 and 30 is coupled to one of the switch outputs between one of the pairs of switches 46. The driver circuitry 50 signals the switches 46 to rapidly close and open, resulting in a three phase waveform output across output terminals 26, 28 and 30. The driver circuitry 50 is controlled by the control circuitry 52, which responds to the remote control and monitoring circuitry 54 through the network 56.

Figure 2:
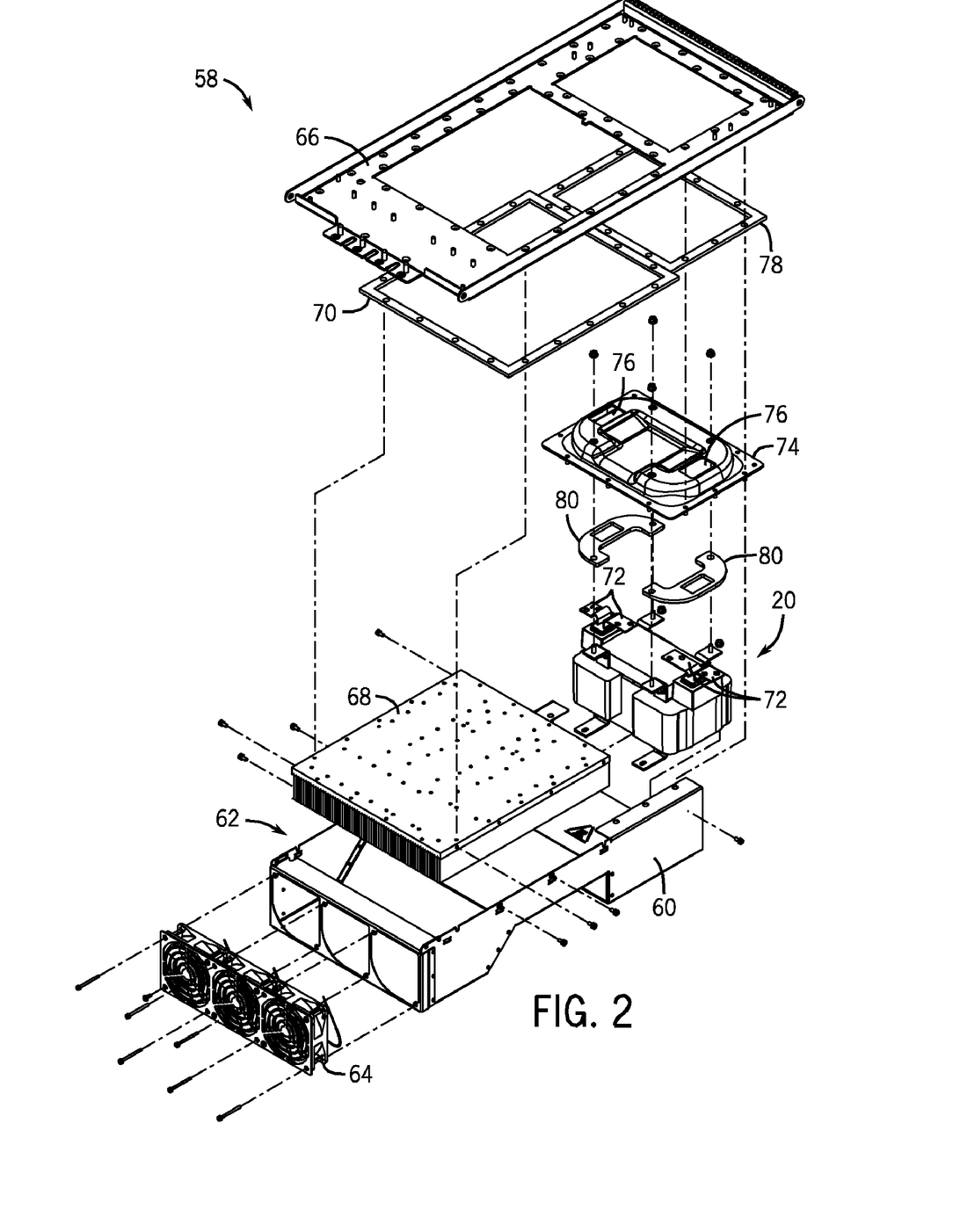
FIG. 2 is a perspective exploded view of a partial motor drive unit depicting an improved choke in accordance with one embodiment of the present invention.

Turning to FIG. 2, a perspective view of an exemplary motor drive unit 58 employing an improved choke configuration in accordance with one embodiment is shown. Many of the circuit components described above, including the choke 20, will typically generate significant amounts of heat, which can lead to component failure due to overheating. Therefore, the motor control circuit 10 may be packaged within a unit that includes a system for enhancing the heat dissipating properties of the motor control circuit 10. Accordingly, the motor drive unit 58 may include a frame 60 that defines a cooling channel 62. The cooling channel may include a heatsink 68 that is thermally coupled to the electrical components described above. The motor drive unit 58 may also include a set of fans 64 to provide a flow of cooling air through the cooling channel 62 and the heatsink 68, drawing heat from the motor drive circuitry.

In some embodiments, the cooling channel may be subject to harsh environmental conditions. For example, the motor drive unit 58 may be mounted to an exterior wall, such that the front side of the motor drive unit 58 (i.e. the cabinet) faces the interior of the building to provide access to the controls and electrical inputs and outputs of the drive unit 58, while the backside of the motor drive unit (i.e. the cooling channel 62) faces the outdoors. In this case, although the circuitry on the front side of the motor drive unit is protected from the outside environment by the barrier 66, the cooling channel 62 is exposed to the outside environment. Therefore, the cooling channel may be sealed off from the cabinet to prevent exposing sensitive electronics to water, dust and salt.

The switches 46, SCRs 34, capacitors 44, driver circuitry 50 and controller circuitry 52 may be situated adjacent to the cooling channel 62 on top of the heatsink 68 and the barrier 66. Thus, the barrier 66 and the top surface of the heatsink 68 form the base of the cabinet within which most of the motor drive circuitry will be contained. The barrier 66 separates the cabinet from the cooling channel, protecting the motor drive circuitry in the cabinet from exposure to harmful environmental conditions while the heatsink 68 allows heat from the circuitry to pass through into the cooling channel. To form a water tight seal between the cabinet and the cooling channel 62, a gasket 70 is situated between the heatsink 68 and the barrier 66.

As mentioned above, the choke 20 may be situated within the cooling channel 62 to make efficient use of the space within the motor drive 58 and keep heat generated by the choke 20 out of the cabinet. Therefore, the choke 20 may be exposed to the outside environment. The choke 20 is coupled to the DC bus 36 by the inductor leads 72, which extend into the cabinet. To prevent dust, water or salt from entering the cabinet, the interface between the choke and the cabinet may be sealed. For example, in the depicted embodiment, the choke is covered by a protective plate 74 that extends through and fastens to the barrier 66. The plate 74 includes openings 76 that allow the inductor leads 72 to extend into the cabinet from the cooling channel 62. Additionally, a gasket 78 is positioned between the barrier 66 and the plate 74 to form a seal around the interface between the barrier 66 and the protective plate 74. Two gaskets 80 are also positioned between the plate 74 and the choke 20 around the openings 76. To ensure a tight seal between the plate 74 and the choke 20, the choke 20 is shaped to interface with the plate 74 and the gaskets 80, as will be described further below. Furthermore, to prevent electrical failure of the choke 20, the choke 20 itself may also be sealed in accordance with embodiments discussed herein to protect against dust, water, and salt.

Figure 3:
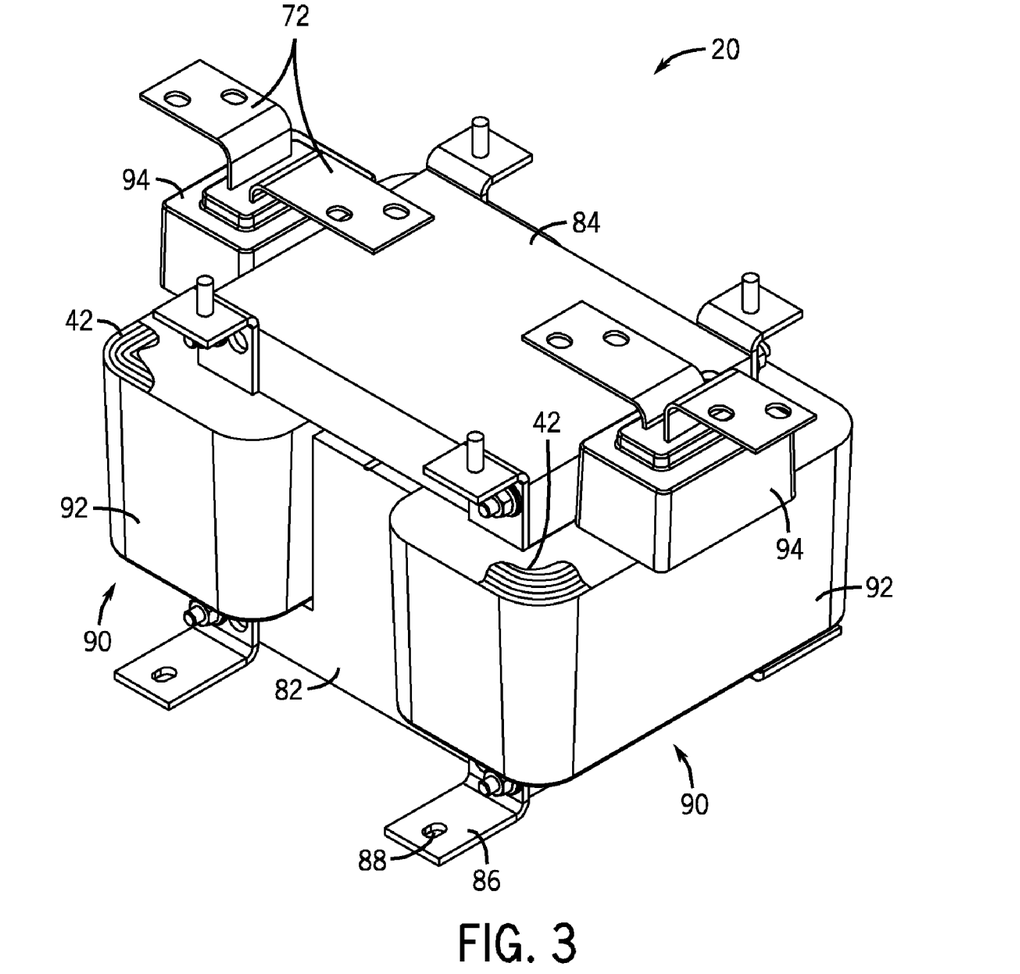
FIG. 3 is a perspective view of the improved choke shown in FIG. 2.

Turning to FIG. 3, an exemplary choke 20 that provides improved protection from the environment is shown. The choke 20 may include an E-shaped core element 82 coupled to an I-shaped core element 84 with brackets 86. Both the E-shaped core element 82 and the I-shaped core element 84 may include any form of magnetic material, such a ferromagnetic material. The two inductor coils 42 are mounted to the outside arms of the E-shaped core element 82. The I-shaped core element 84 is positioned over the inductor coil 42 and coupled to the E-shaped core element 82 via the brackets 86, completing the magnetic circuit between the two inductor coils 42 and providing a desired level of mutual inductance between the inductors 42. The mutual inductance may be adjusted by controlling the air gap between the E-shaped core element 82 and the I-shaped core element 84. The air gap is controlled by the dimensions of the bracket 86. Additionally, the brackets 86 may also include mounting holes 88 for attaching the choke 20 to the motor drive unit 58.

The choke 20 may also include the inductor leads 72, which couple each respective inductor 42 to the high-side 38, or the low-side 40 of the DC bus 36. As will be described further below with respect to FIGS. 4 and 5, the inductor coils 42 may be sealed inside a potting 90 that includes a main body 92 and a projection 94. The main body 92 seals the inductor coils 42 from the magnetic core and the outside environment, while the projection 94 surrounds a portion of the inductor coil leads 72 and enables a water tight seal to be made between the cooling channel 62 and the cabinet.

Figure 4:
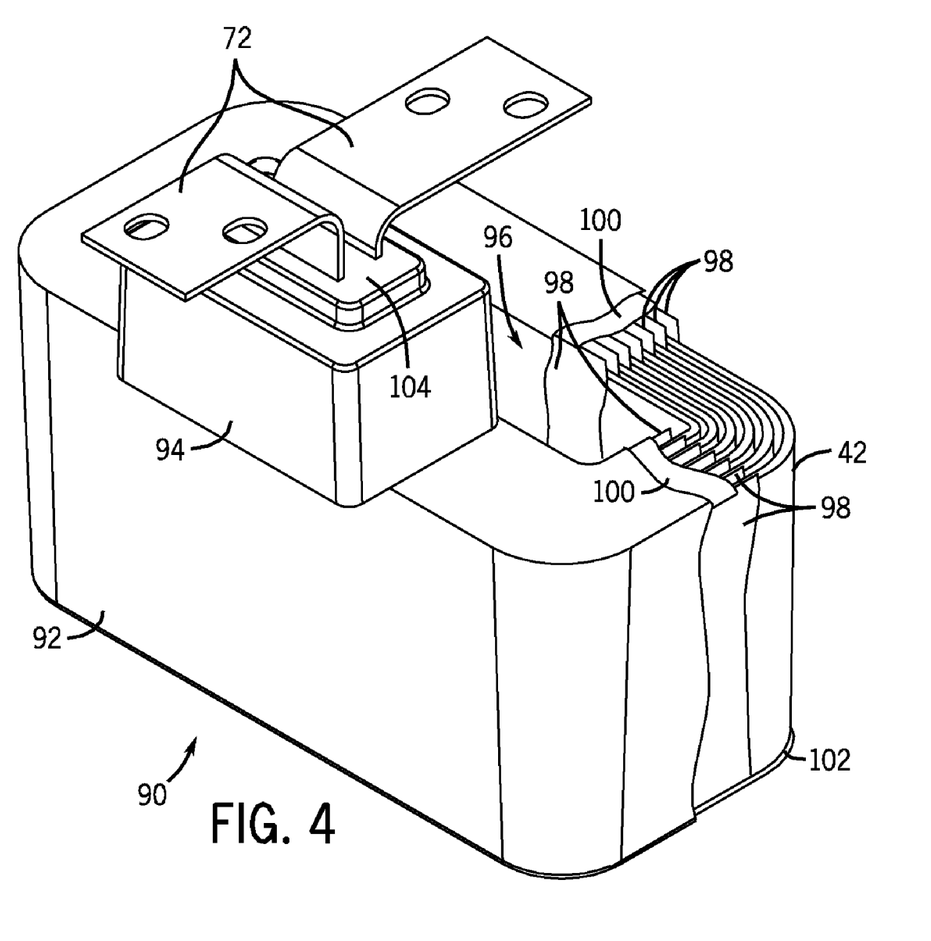
FIG. 4 is a perspective view of an inductor coil shown in FIG. 2 with portions of the structure cut away to show additional details of the internal construction.

Turning now to FIG. 4, a perspective view of an inductor coil 42 is shown in accordance with embodiments. As can be more easily seen in FIG. 4, the main body 92 of the potting 90 forms a ring-like shape with an opening 96 that may receive a magnetic core. The inductor coil 42 may be formed with any suitable conductor, such as aluminum or copper sheets or wire. The height of the conductor as well as the number of windings of the conductor will, in part, determine the inductance of the choke. The gauge or thickness of the sheet will, in part, determine the power handling. The inductor coil 42 is wrapped around the opening 96 and is completely surrounded by the potting 90. The potting 90 may form a unitary piece and may be made of any suitable potting material, such as an epoxy or other resin. In certain embodiments, the potting material may include PD6 Elantis 300 LV, or Dolphon CB-1109. Furthermore, in certain embodiments, the potting 90 may be injection molded.

Within the potting 90 and surrounding the inductor coil 42 are several layers of an insulator. Specifically, a winding insulator 98 separates the layers of the inductor coil 42 and surrounds the inside and outside of the inductor coil. The winding insulator 98 may be a single sheet of insulative material that is wound together with the inductor coil 42. To ensure an effective barrier between the layers of the inductor coil 42, the winding insulator 98 may have a greater height compared to inductor coil 42. To cover both the inside and outside surfaces of the inductor coil 42, the winding insulator may fold over one end of the inductor coil 42. Additionally, a top insulator 100 covers the top of the inductor coil 42, and a bottom insulator 102 covers the bottom of the inductor coil 42. In this way, two layers of electrical insulator surround the inductor coil 42, the insulators 98, 100 and 102, and the potting 90. The insulators 98, 100 and 102 may be made of any suitable electrically insulative material, such as Nomex®, for example. In other embodiments, the conductor may be wire and the winding insulator may be a thin insulative layer that surrounds the wire, in which case the top insulator 100 and the bottom insulator 102 may be eliminated.

As mentioned above, the potting 90 is made out of two sections, the main body, 92, which contains the inductor coil 42, and the projection, which contains the inductor leads 72. The inductor leads extend from the choke 20 through openings 76 in the plate 74 and into the cabinet. The projection 94 is shaped to insulate the inductor leads 72 from each other and from the outside environment. Further, the height of the projection is sized so that the projection insulates that segment of each inductor lead 72 that sits within the cooling channel. In other words, the inductor leads 72 only emerge from the projection inside the cabinet, with no part of the inductor leads 72 being exposed inside the cooling channel 62. Additionally, the projection 94 also includes a raised surface 104 that fits through the openings 76 and the gasket 80 described above in relation to FIG. 2. The raised surface 104, enables proper alignment between the choke 20 and the openings 76, and helps to ensure a water tight seal between the cooling channel 62 and the cabinet. In some embodiments, a water proofing may be applied around the opening 76 in addition to, or in place of, the gaskets 80.

Figure 5:
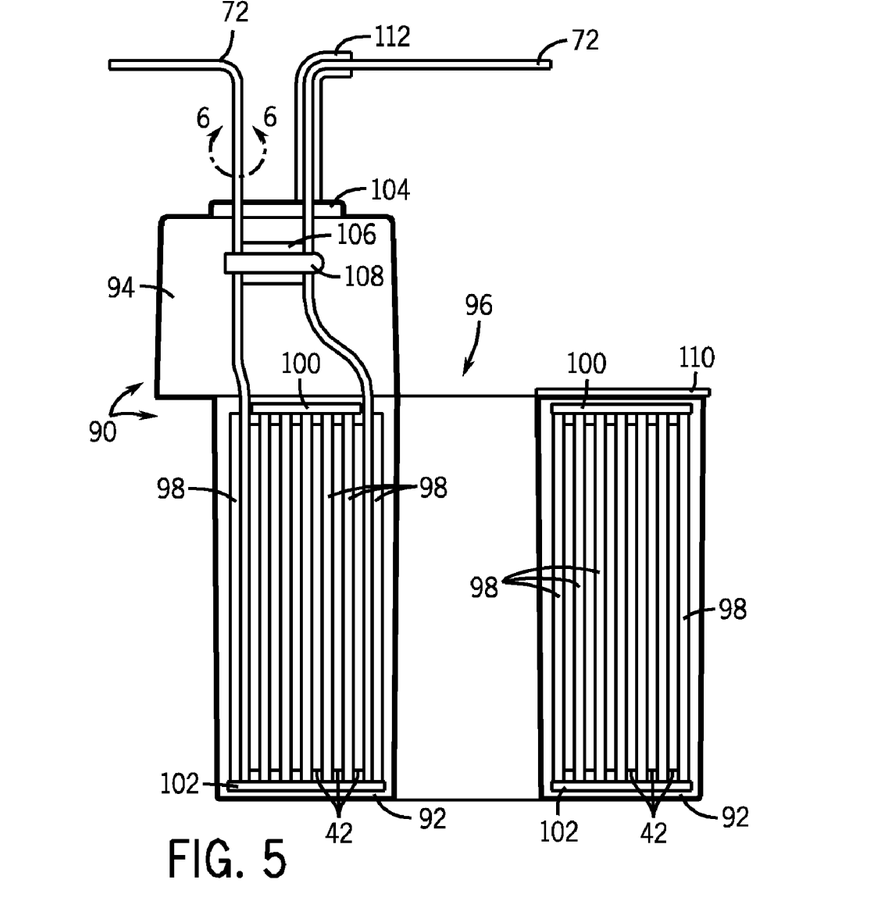
FIG. 5 is a cross section of an exemplary inductor coil shown in FIG. 4 providing additional details regarding the construction of the choke.

Turning now to FIG. 5, a cross-section of the assembled inductor coil 42 of FIG. 4 is shown. In FIG. 5 it can be seen that the windings of the inductor coil 42 are separated and surround by the winding insulator 98 and that the top insulator 100 and bottom insulator 102 further insulate the inductor coil 42, forming a complete insulative layer around the inductor coil 42 within the potting 90 as explained above in relation to FIG. 4. As an additional layer of protection, another insulator 110 may be laid flat over a portion of the top of the main body 92 of the potting 90. The insulator 110 provides an additional layer of electrical separation between the inductor coil 42 and the I-shaped core element 84. The insulator 110 may be any suitable insulator, such as Nomex®, for example.

FIG. 5 also depicts the coupling between the inductor coil 42 and the inductor leads 72. Specifically, the inductor leads 72 may lie flat against a surface of the inductor coil 42 at opposite ends of the inductor coil 42. The inductor leads 72 may be electrically coupled to the inductor coil 42 via soldering. Additionally, the winding insulator 98 may wrap around the inductor leads 72 where they couple to the inductor coil 42.

The inductor leads 72 extend through the projection 94. As seen in FIG. 5, the inside edge of the projection 94 is flush with the side of the opening 96. This allows the I-shaped core element to sit flush over the portion of the E-shaped core element that extends through the opening 96. At the outer edge, however, projection 94 hangs over the outer edge of the main body 92. This provides more substantial potting material around the inductor leads 94. Furthermore, the inductor leads 72 curve toward the outer edge in order to be centered within the projection 94. Inside the projection 94, a spacer 106 is situated between the inductor leads 72 and a strap is situated around the inductor leads 72. Together, the spacer 106 and the strap 108 ensure the proper spacing between the inductor leads 72 during the process of molding the potting 90 around the inductor coil 42. Additionally, in some embodiments, the ends of one or both leads 72 that emerge from the projection 94 may be surrounded by an insulator 112 that butts against the raised surface 104. The insulator 112 may be shrink tubing, for example. Line 6-6 shows the location of a close-up view of the inductor lead 72 illustrated in FIG. 6.

In some embodiments, the inductor leads 72 may be flexible. Making the inductor leads 72 flexible allows the manufacturing tolerances of the choke 20 to be relaxed while still mating the inductor leads 72 to the DC bus 36 at the appropriate position within the cabinet. Furthermore, the flexibility of the inductor leads 72 enables the openings 76 to be relatively small, due to the fact that, during installation of the choke, the leads 72 may be straightened out for passing the leads 72 through the openings 76 and then bent into place for coupling to the power source. Reducing the size of the openings 76 reduces the size of the area to be sealed and enables the projection 94 to more reliably and conveniently mate with the openings 76.

Figure 6:
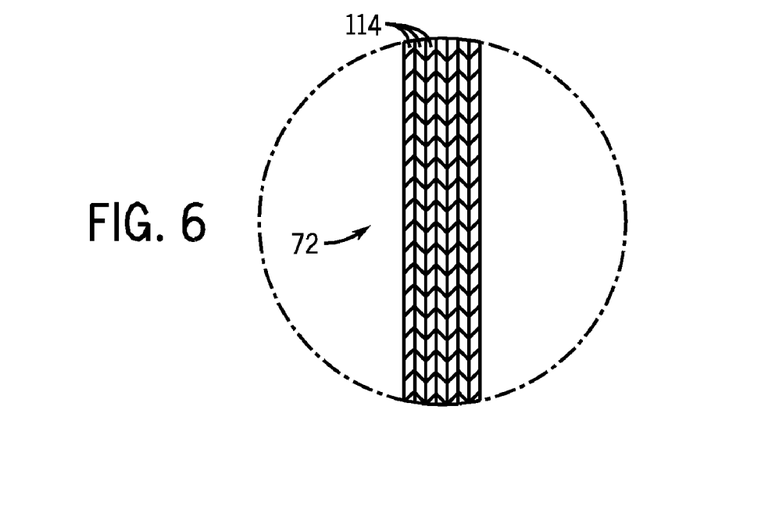
FIG. 6 is an enlarged view of one of the inductor leads shown in FIG. 5.

To achieve flexibility of the inductor leads 72, the inductor leads 72 may be a laminate of several thin metal layers 114, as shown in FIG. 6. In one embodiment, the inductor leads 72 are made of seven layers of 0.01 inch thick copper strap. To provide rigidity inside the main body 92 of the potting 90 and ensure a reliable electrical contact to the inductor coil 42, the metal layers 114 may be soldered together over a portion of their length.

Figure 7:
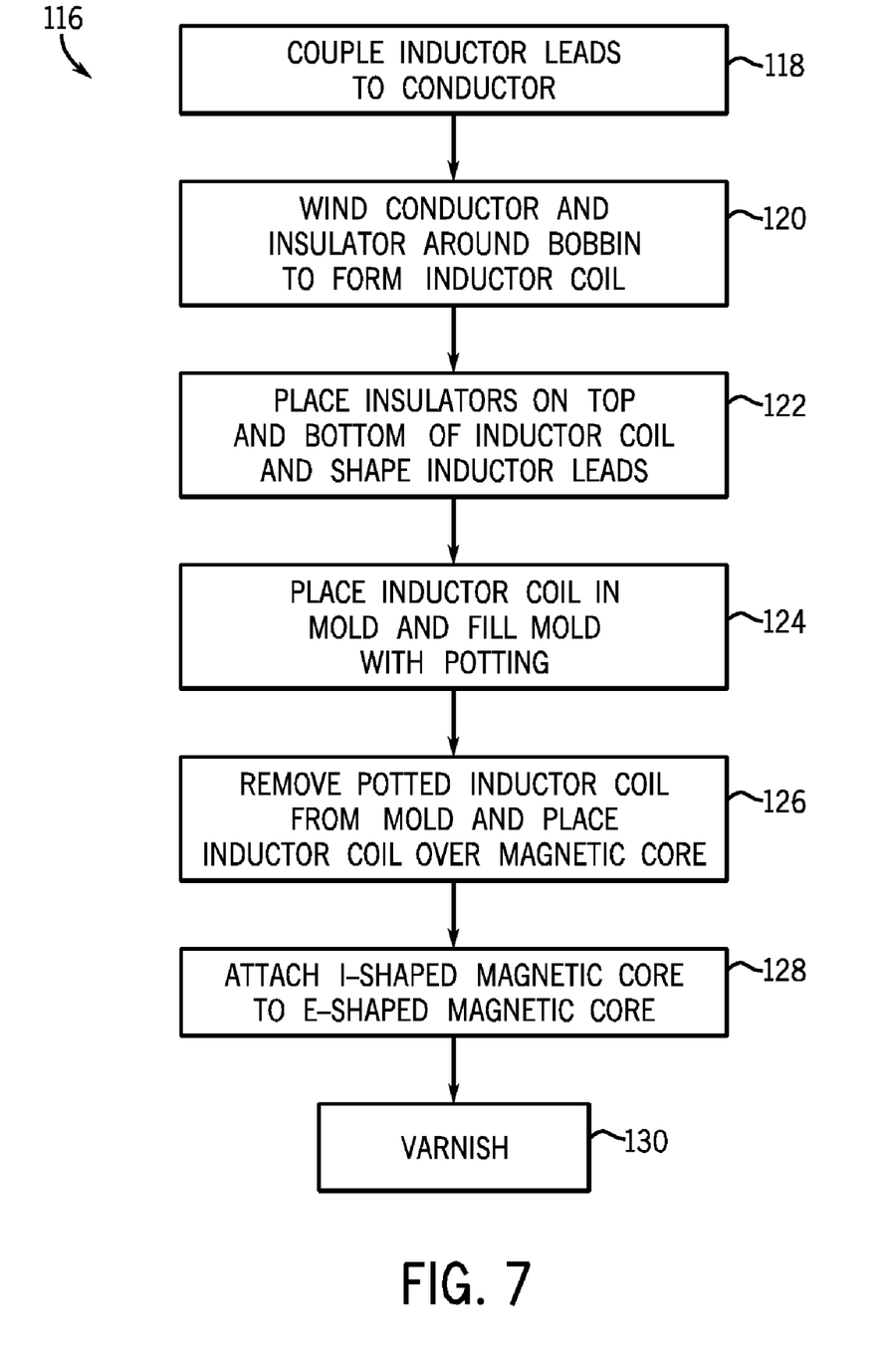
FIG. 7 is a flow chart of an exemplary method of fabricating the improved choke.

Turning now to FIG. 7, a method of fabricating the choke assembly illustrated in FIGS. 4 and 5 is illustrated. Process 116 begins at step 118, in which the inductor leads 72 are coupled to the conductor that will make up the inductor coil. For example, the inductor leads 72 may be soldered to the conductor. In embodiments in which the inductor lead includes several metal layers 114, as shown in FIG. 6, the metal layers 114 may also be soldered to one another during step 118.

Next, at step 120, the conductor and an adjacent winding insulator 98 are wound around a bobbin to form the inductor coil 42. The winding insulator 98 may be folded over the conductor at one end so that the internal and external surfaces of the winding are covered by the insulator. The winding insulator 98 may be fastened at one end with tape, an adhesive or other suitable fastener, to prevent the insulator from being pushed away from the inductor coil during the molding step. In some embodiments, the bobbin may be removed after the inductor coil is formed.

Next, at step 122, insulators 100 and 102 are placed over the top and bottom of the inductor coil 42. In embodiments, the insulators 100 and 102 may be held in place by tape, an adhesive, or any other suitable fastening mechanism. Additionally, the inductor leads 72 may be shaped so that they will pass through the projection 94 at the desired position and orientation. In the embodiment shown in FIG. 5, the inductor leads 72 emerge from the top of the projection 94 at approximately the middle of the projection 94, thus helping to ensure substantial insulation on all sides of the inductor leads 72. To hold the inductor leads in the proper position, the spacer 106 may be positioned between the inductor leads 106, and the strap 108 may be placed around the inductor leads.

Next, at step 124, the inductor coil is placed in the mold. The mold may be a two piece mold with a parting line at the top of the main body 92 of the potting 90. To facilitate the removal of the potting 90 from the mold, both pieces of the mold may be tapered. After the inductor coil is positioned within the mold, the mold may filled with potting material, which is allowed to harden.

Next, at step 126, the potted inductor coil 42 is removed from the mold and placed over the magnetic core. In embodiments, the magnetic core may include an E-shaped core element 82, in which case, two inductor coils 42 may be installed over the side projections of the E-shaped core element 82 and the brackets 86. At this time, the insulator(s) 112 may be applied to the portion of the inductor lead that extends from the potting 90. In embodiments, the insulator 112 may be a shrink tubing that is heated to conform to the shape of the inductor lead 72. Additionally, the insulator 110 may also be placed over the inductor coil 42 coil. The insulator 110 may be held in place by an adhesive, tape or other fastener, or may be held in place by the pressure of the I-shaped core element 84.

Next, at step 128, the I-shaped core element 84 may be attached to the E-shaped core element 82. The spacing between the I-shaped core element 84 and the E-shaped core element 82 may be predetermined according to known inductive characteristics of such chokes. Finally, at step 130 the assembled choke 20 may, in some embodiments, be covered with a layer of varnish. The varnish may provide an additional level of protection against dust, water and salt, protection against corrosion, and may also serve to securely fasten the inductor coil 42 to the core element 70, thereby minimizing vibrations. The choke 20 may then be installed within the motor drive unit 58.

With the choke arrangement described above, significant protection from environmental conditions may be realized. The techniques described provide two layers of protection around the inductor coil 42. The insulators 98, 100, and 102 surround the inductor winding and forming a first layer of protection, while the potting 90 provides a second layer of protection and forms a hard shell around the inductor coil. Furthermore, the molded projection 94 insulates the inductor leads 72 while also providing a surface that mates with the cabinet, allowing a water tight seal between the cooling channel 62 and the cabinet. By providing a choke with significant protection against outside environmental conditions, the motor drive unit 58 may be mounted such that the cooling channel 62 is projected through an exterior wall of a building and exposed to the outdoor environment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive comprising:
   rectifier circuitry coupled to an AC power source and configured to provide power to a DC bus;
   inverter circuitry coupled to the DC bus and configured to generate drive signals for driving a motor;
   a cooling channel disposed adjacent to the rectifier circuitry and the inverter circuitry and configured to draw heat from the rectifier circuitry and the inverter circuitry; and
   a choke assembly disposed in the cooling channel comprising:
   an inductor coil comprising an insulated conductor wound around a central axis;
   a potting disposed about the inductor coil, the potting configured to encase the inductor coil in a ring-shaped housing with an opening for receiving a magnetic core; and
   a magnetic core disposed within the opening, coaxially with the inductor coil, wherein the inductor coil comprises inductor leads coupled to the ends of the insulated conductor and wherein the potting comprises a projection that insulates a portion of the inductor leads inside the cooling channel and mates with an opening in a barrier separating the cooling channel from at least the rectifier circuitry and the inverter circuitry.

2. The motor drive of claim 1, wherein the inductor leads are flexible and pass through the barrier via the opening at the interface of the projection and the opening.

3. The motor drive of claim 1, wherein the inductor leads comprise thin, laminated, metal straps.

4. The motor drive of claim 1, comprising a gasket disposed between the projection and the opening in the barrier, the gasket forming a water tight seal around the opening.

5. The motor drive of claim 1, wherein the insulated conductor comprises a conductive sheet disposed adjacent to an electrically insulative sheet.

6. The motor drive of claim 1, comprising a layer of varnish surrounding the choke assembly and filling a void between the magnetic core and the potting.

7. The motor drive of claim 1, wherein the choke assembly comprises at least two inductor coils, at least one of the conductor coils coupled to a high side of the DC bus, and at least one of the conductor coils coupled to a low side of the DC bus.

8. The motor drive of claim 7, wherein the magnetic core comprises an E-shaped magnetic material comprising a center projection and two side projections, and wherein two of the at least two inductor coils are disposed around the two side projections.

9. A choke assembly, comprising:
   an inductor coil comprising an insulated conductor wound around a central axis, wherein the inductor coil further comprises electrical leads coupled to the ends of the insulated conductor and configured to be coupled to an electrical bus;
   a potting material surrounding the inductor coil, the potting configured to encase the inductor coil in a ring-shaped housing with an opening for receiving a magnetic core, and to seal the inductor coil from the outside environment; and
   a magnetic core disposed within the opening, coaxially with the inductor coil, wherein the potting material comprises a projection that insulates a portion of the electrical leads inside a cooling channel, the projection configured to mate with an opening in a barrier separating a cooling channel from at least a rectifier circuitry and an inverter circuitry.

10. The choke assembly of claim 9, wherein the projection includes a raised surface configured to mate with the opening in the barrier.

11. The choke assembly of claim 9, wherein the magnetic core comprises an E-shaped ferromagnet.

12. The choke assembly of claim 9, wherein the electrical leads are flexible to allow a size of the opening to be reduced while still permitting the electrical leads to pass through the opening.

13. A method of fabricating a choke, comprising:
   coupling at least two electrical leads to an inductor coil comprising an insulated conductor, wherein the electrical leads are coupled to the ends of the insulated conductor;
   winding the insulated conductor around a central axis to form a coil;

placing the coil into a ring-shaped mold with an opening for receiving a magnetic core;

filling the mold with potting material and allowing the potting material to harden to form a potted coil comprising a main body configured to surround the coil, wherein the potting material comprises a projection configured to surround a portion of the at least two electrical leads inside a cooling channel, the projection configured to mate with an opening in a barrier separating a cooling channel from at least a rectifier circuitry and an inverter circuitry; and inserting a magnetic core into the opening, coaxially with the inductor coil.

14. The method of claim 13, wherein the insulated conductor comprises a conductive sheet disposed adjacent to an insulative sheet, and wherein the insulative sheet is interposed between the layers of the conductive sheet during the formation of the coil.

15. The method of claim 13, wherein the magnetic core includes two pieces, a first piece being inserted through the opening, and a second piece being magnetically coupled to the first piece after insertion of the first piece through the opening.

16. The method of claim 13, wherein the at least two electrical leads include a lamination of a plurality of thin, flexible, metal straps.

* * * * *